Oct. 27, 1942.　　　　J. L. EDLUND　　　　2,300,111
FAUCET AND VALVE THEREFOR
Filed Feb. 3, 1940　　　　2 Sheets-Sheet 1
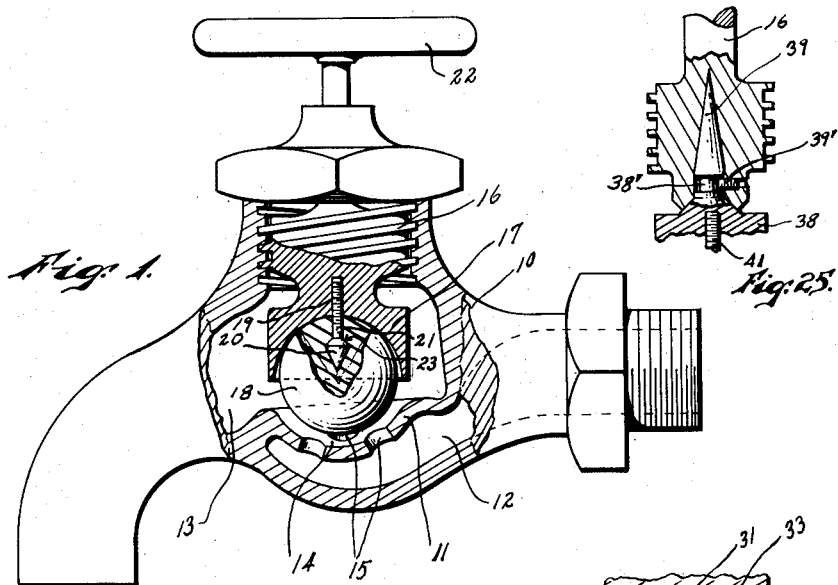
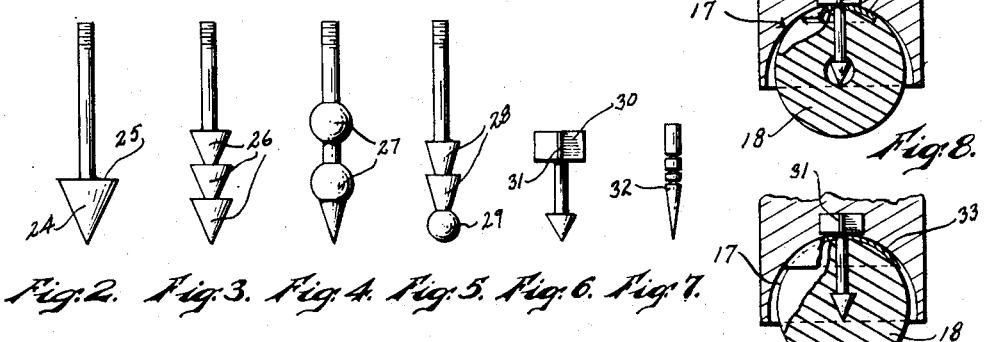
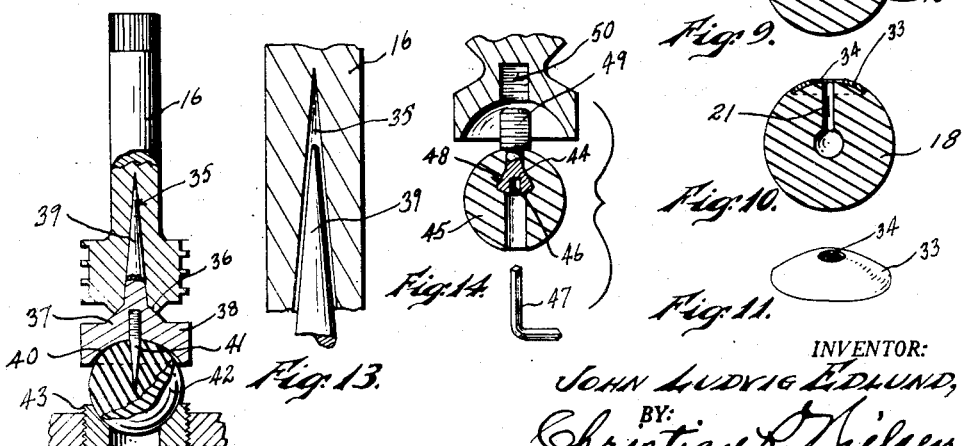
INVENTOR:
JOHN LUDVIG EDLUND,
BY: Christian R. Nielsen
ATTORNEY Oct. 27, 1942.  J. L. EDLUND  2,300,111
FAUCET AND VALVE THEREFOR
Filed Feb. 3, 1940  2 Sheets-Sheet 2
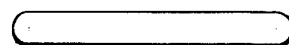
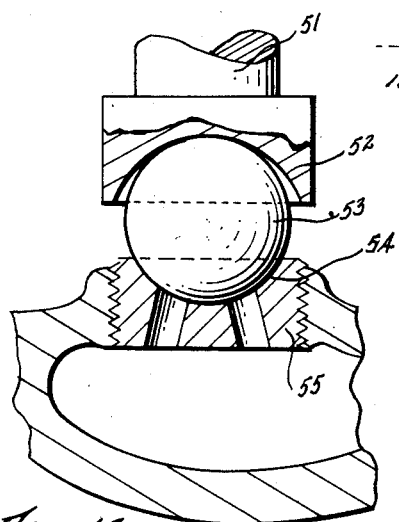
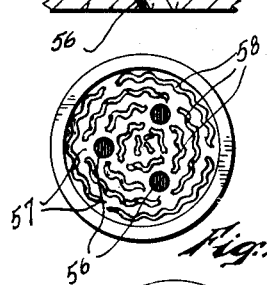
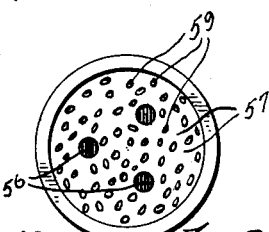
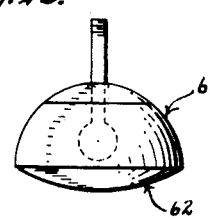
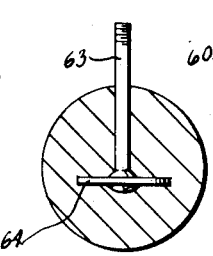
INVENTOR:
JOHN LUDVIG EDLUND,
BY Christian R. Nielsen
ATTORNEY Patented Oct. 27, 1942

2,300,111

UNITED STATES PATENT OFFICE 2,300,111

FAUCET AND VALVE THEREFOR

John Ludvig Edlund, Calgary, Alberta, Canada

Application February 3, 1940, Serial No. 317,168
In Canada February 13, 1939

2 Claims. (Cl. 251—46)

This invention relates to faucet and valve constructions and it consists in the constructions, arrangements and combinations herein described and claimed.

It is the cardinal purpose of the invention to provide a novel construction of faucet and valve which will be highly effective to provide a positive closure with its seat, regardless of the length of time of use of the valve, inasmuch as the valve is of the swivel type, thus permitting the valve to properly adjust new surfaces to the seat.

It is also an object of the invention to provide novel means of connection between a faucet stem, and the valve, permitting ready application and replacement of the valves as needed.

It is a still further object of the invention to provide an anti-friction bearing surface between the valve and the faucet stem to permit ready rotary movement of the valve.

It is also an object of the invention to provide a faucet having a valve of hard though compressible composition ball cooperable between a concave seat and a similar base of a faucet stem, the latter partly encircling the ball valve, and having an axial attaching means for removably securing the valve thereto; the concave portion of the stem functioning to compress a portion of the ball around and upon the attaching portion of the stem, insuring positive retention of the ball upon the stem regardless of the length of use of the valve.

Additional objects, advantages and features of invention will be apparent from the following description, considered in conjunction with the accompanying drawings, wherein:

Figure 1 is a side elevation of a faucet, partly in section, showing one form of the invention.

Figures 2 to 7 inclusive are side elevations of various modified forms of ball valve attaching means.

Figure 8 is a sectional view of a valve and portion of stem illustrating one manner of attaching the valve thereto, and also showing an anti-friction means embodied integrally with the ball valve.

Figure 9 is a similar view of a modified form of the valve and stem.

Figure 10 is a sectional view of a modified form of the ball valve.

Figure 11 is a perspective view of the anti-friction means therefor.

Figure 12 is a sectional view partly in section illustrating a modified form of anti-friction means for the spherical valve.

Figure 13 is an enlarged detail thereof.

Figure 14 is a sectional view illustrating a modified form of valve and attaching means for the valve.

Figure 15 is an elevational view of a faucet, partly in section, illustrating a further form thereof.

Figure 16 is an enlarged detail of the valve, stem and valve seat.

Figure 17 is a top plan view of a preferred form of valve seat.

Figure 18 is a cross section on the line 18—18 of Figure 17.

Figures 19 to 21 illustrate modified constructions of valve seats.

Figure 22 is a vertical sectional view of the form shown in Figure 21.

Figure 23 is a modified form of the valve.

Figure 24 is a vertical sectional view of a still further form of the valve.

Figure 25 is a fragmentary sectional view of a modified form of valve shown in Figure 12.

Figure 26 is an enlarged fragmentary sectional view of a further form of valve seat.

Attention is first invited to Figure 1 of the drawings, wherein a conventional type of faucet 10 is illustrated having a diaphragm 11 dividing the inlet 12 from the outlet 13. The diaphragm is provided with a concave or semi-spherical seat 14 perforated as at 15, to permit passage of liquid from the inlet to the outlet, as is well understood.

The faucet 10 comprises a rising manually operable stem 16 in the present instance, being shown as screw-threaded with complemental screw-threads of the faucet to effect opening or closing of a valve as is generally understood. Preferably, the length of the screw-threaded portion of the stem 16 is such as to limit upward movement thereof beyond full unseating position of the valve.

The stem 16 has formed at its lower end a semi-spherical seat 17 of a radius greater than its cooperable ball valve 18 for a purpose presently to be explained, it being understood of course, that the valve 18 is of such diameter as to effectively close the perforations 15 when in seated engagement upon the diaphragm.

In the present instance, the lower end of the stem 16 is axially bored and tapped to receive a threaded stud 19. The stud 19 has an enlarged conical shaped head 20 formed integrally therewith and functions for securement of the ball valve 18 as will be described.

It should be noted that the head 20 stops inwardly of the lower edge of the seat 17 of the stem and when engaged within the ball valve 18, the apex of the head 20 stops approximately at the center of the ball valve 18.

In the present instance, the valve 18 will be molded, provision being made to simultaneously form the bore 21 for reception of the stud 19 and head 20.

When assembling the ball valve to the stem 16, the stud 19 may be screwed home within the stem and the valve then presented over the head, or the valve may be first fixed to the head 20, and the stud 19 then screwed into the stem. Preferably, after the ball valve is anchored to the stud and head, the valve will be given a rotary movement to lessen frictional engagement between the head and the bore 21 to permit rotary movement of the valve during use.

It will be assumed that the valve as shown in Figure 1 is to be moved to a closed position with respect to the seat on the diaphragm 11. The stem 16 is appropriately turned by means of the handle 22, thereby moving the ball valve 18 downwardly until it contacts the diaphragm 11. By slight further movement the ball 18 will be forcibly compressed upon the diaphragm, thus closing the ports 15. During the compressive action of the ball, the body thereof is deformed laterally to a certain extent, limited by the walls of the semi-spherical seat 17. This lateral deformity of the ball is permitted by reason of the fact that the seat is of greater radius than the ball, and when this action occurs, it will be apparent that the body of the ball valve 18 will be forced firmly in and around the stud 19 and head 20, effecting a firm grip thereon. This is an important function where a valve has been in long use and there is a tendency for the ball valve to become loose upon the head.

It is also important to note that by stopping the head 20 inwardly of the lower edge of the seat 17 the tendency of forcing the head into the ball to an excessive degree is obviated.

The head 20 in the present instance is shown as having a slightly rounded base 23 facilitating removal of the ball for replacement.

In Figure 2 a modified form of head 24 is shown, differing from that of Figure 2 in the provision of a straight flat base 25.

Figure 3 illustrates a modified form of that shown in Figure 2 and found especially desirable where a large faucet is embodied and employing a corresponding ball valve. In this form a plurality of tandem arranged heads 26 are formed on the stud. However, the same results may be attained in the provision of tandem ball elements 27 as shown in Figure 4; or a combination of cone-shaped and ball-shaped heads 28 and 29 may be found equally effective.

While the stud 19 has been described as threadedly engaged with the stem 16 it is possible to provide the stud with an anchor member 30 adapted to have a press fit in a suitable aperture formed in the stem. In this instance the anchor member 30 will have a vertical channel 31 formed in a side thereof so as to relieve a vacuous condition created upon insertion of the anchor within the aperture of the stem.

A further form of stud is illustrated in Figure 7 and in this instance, the head 32 is shown as quite pointed for penetration of a solid ball valve. A suitable number of vertically spaced circumscribing kerfs are formed in the stud to provide a grip upon the ball.

Where a more freely rotatable ball valve is desired, I have provided an anti-friction disk 33, adapted to contact the base of the seat 17. As shown in Figure 8, the disk may be molded within the ball, or, as shown in Figure 9, the disk may be positioned loosely exteriorly of the ball. The disk 33 will have an opening 34 of a size to readily receive the head 20 therethrough so that it may enter the bore 21 of the ball valve.

A further form of providing an anti-friction ball is shown in Figures 12 and 13, and in addition means are provided for compensating for wear which may occur between the spindle employed and its bearing. Attention is now directed to these figures for an understanding of the construction.

The stem 16 in this instance is provided at its lower end with an internal tapering socket 35, tapering outwardly in a downward direction and terminating in a seat 36, complemental to an annular boss 37 formed on a ball cage 38. The cage 38 has a tapering spindle 39 complemental to the socket 35 and is of a length less than the socket, so that as wear occurs, the spindle may be accommodated within the socket.

The cage 38 has a semi-spherical seat 40 (the equivalent of the seat 17), from which there projects a stud 41 for anchorage of a ball valve 42. The valve 42 cooperates with a seat 43 as in the first form described. In this form, the ball 42 is freely rotative both on the spindle 39 and the stud 41 during the passage of water through the seat 43.

In Figure 14 a further means for securing a ball valve to the stem is illustrated, and as here shown a headed stud 44 is forced into an aperture 48 formed in the ball valve 45. The stud 44 is provided with an angular socket 46 for reception of a wrench 47 when positioned through the opening 48 in the ball, the latter being in registry with the socket. The other end of the stud 44 terminates in a threaded portion 49 for securement in a threaded socket 50 of the stem. In this form of valve, when the ball valve is compressed, the aperture 48 is deformed slightly tending to pack the adjacent material in and around the stud.

In the forms of the valve thus far described, the ball valve has been set forth as anchored to the valve stem for rotative movements, but it should be understood that the ball valve may be entirely free of the stem and such a construction is illustrated in Figures 15 and 16. The stem 51 is provided with a concave or semi-spherical seat 52 complemental to a ball valve 53 to force the same upon a concave seat 54 of a diaphragm 55 of the faucet.

It should be understood that the stem 51 has an upward movement only sufficient to allow full unseating of the ball valve, the seat 52 of the stem confining the valve to insure its proper return to the seat 54 when desired. The radius of the seat 52 is greater than the radius of the ball when not under compression, reducing surface friction between the respective seats and the ball valve. In the open position of the faucet, the ball valve is freely rotatable to present new surfaces for closure of the valve, and this rotary movement may be materially assisted in the provision of ports 56 in the diaphragm. In Figures 17 and 18, the ports 56 are shown at a tangent to the seat 54, and obviously water or other liquid passing upwardly through the ports will cause rotary movement of the ball valve, since impingement of the water against the valve will be at such an angle as to produce such movement. The slant or inclination of the ports 56 are slightly exaggerated for the purpose of illustration, and it will of course, be understood that this will vary according to the requirements of various valves and water pressures involved.

It is also within the scope of the invention to provide valve seats which are most effective to provide proper seating of a ball valve and in Figure 19, I have illustrated the seat 57 as embodying a multiplicity of surface irregularities 58, which are adapted to embed themselves in the ball valve to a slight extent when the stem of the valve is operated to seat the valve; while in Figure 20, the irregularities are in the form of a multiplicity of protuberances 59. In Figures 21 and 22, the seat 57 is shown as embodying a plurality of circumscribing grooves 60.

In all forms of the valve per se, it has been described as spherical, but in Figure 23, I have illustrated a valve 61 having a convex portion 62 representing only a portion of a sphere, and of greater radius only than the main body portion of the valve.

Figure 24 illustrates a form of valve in which the attaching stud 63 embodies an integral washer 64 molded within the ball.

It should be understood that in those forms of the valve which are disclosed as removable from its securing or anchoring stud, the head may be so formed as to permit ready removal by a direct, straight pull, or the head may be shaped to resist the pull slightly, by the provision of a flat or angular head, as indicated in Figure 2.

In Figure 25, the cage 38' is illustrated as anchored rotatably to the stem 16, and this is accomplished in the provision of an annular groove 38' into which a stud 39' is extended. The stud 39' is threadedly engaged through an aperture formed in the stem.

Various constructions of valve seats have been described and in Figure 26 a still further form is illustrated. In this instance, the seat face 57' is illustrated as comprising a minutely undulated surface. Obviously this surface provides a substantial frictional contact with the surface of the ball valve insuring a very effective closure.

While I have shown various modifications of my valve this is by way of illustration only, and I consider as my own all such variations in structure as fairly fall within the scope of the appended claims.

I claim:

1. In a valve for faucets or the like, a stem, the stem having a semi-spherical recess in the lower end thereof, a stud fixed centrally of the recess and having an enlarged head terminating in a reduced lower end, the lower end of the head stopping inwardly of the lower edge of the recess; a deformable ball valve, said valve having an aperture for reception of the head and portion of the stud, said valve being rotatable thereon, and said recess being of a greater radius than the ball valve whereby to compress adjacent portions of the ball valve in and around the head and stud upon forcible seating of the ball valve.

2. A valve for a faucet or the like comprising a stem, the stem having a cup-like recess in the lower end thereof, the recess having a threaded aperture centrally thereof, a threaded stud engaged in the aperture, the stud having an enlarged tapering head at its lower end, said head being positioned inwardly of the lower edge of the recess, a deformable ball valve complemental to the cup-like recess of a diameter less than the cup-like recess and having a bore and recess, the recess being located approximately medially of the ball valve and adapted to receive the head and stud therewithin, and said ball valve being cooperable with a valve seat to effect closure thereof upon actuation of the stem.

JOHN LUDVIG EDLUND.